S. SHAPIRO.
APPARATUS FOR PASTEURIZING AND COOLING MILK.
APPLICATION FILED AUG. 29, 1913.
1,108,404.
Patented Aug. 25, 1914.
3 SHEETS—SHEET 1.
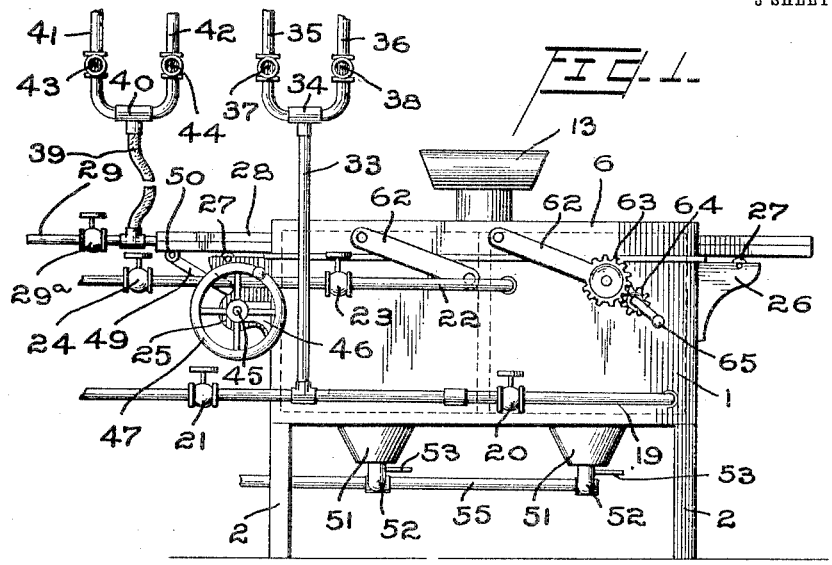
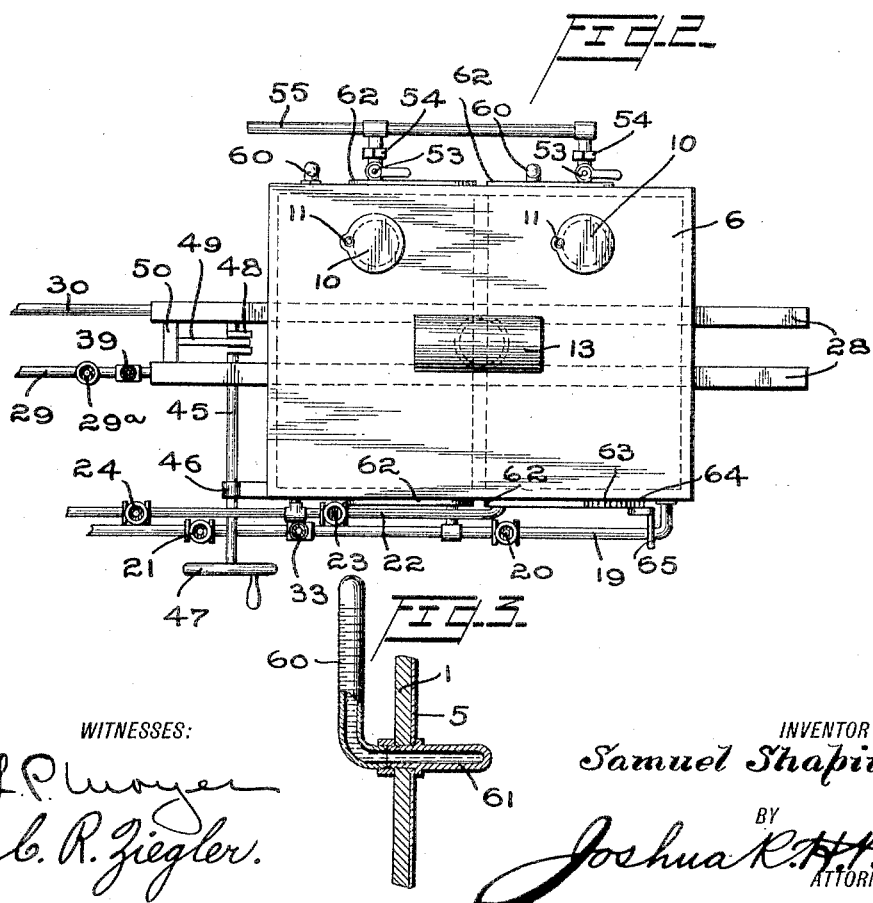
WITNESSES:
L. P. Moyer
C. R. Ziegler.
INVENTOR
Samuel Shapiro,
BY
Joshua R. H. Potts
ATTORNEY S. SHAPIRO.
APPARATUS FOR PASTEURIZING AND COOLING MILK.
APPLICATION FILED AUG. 29, 1913.

1,108,404.

Patented Aug. 25, 1914.
3 SHEETS—SHEET 2.

WITNESSES:
L. P. Moyer
C. R. Ziegler.

INVENTOR
Samuel Shapiro
BY
Joshua R. H. Potts
ATTORNEY

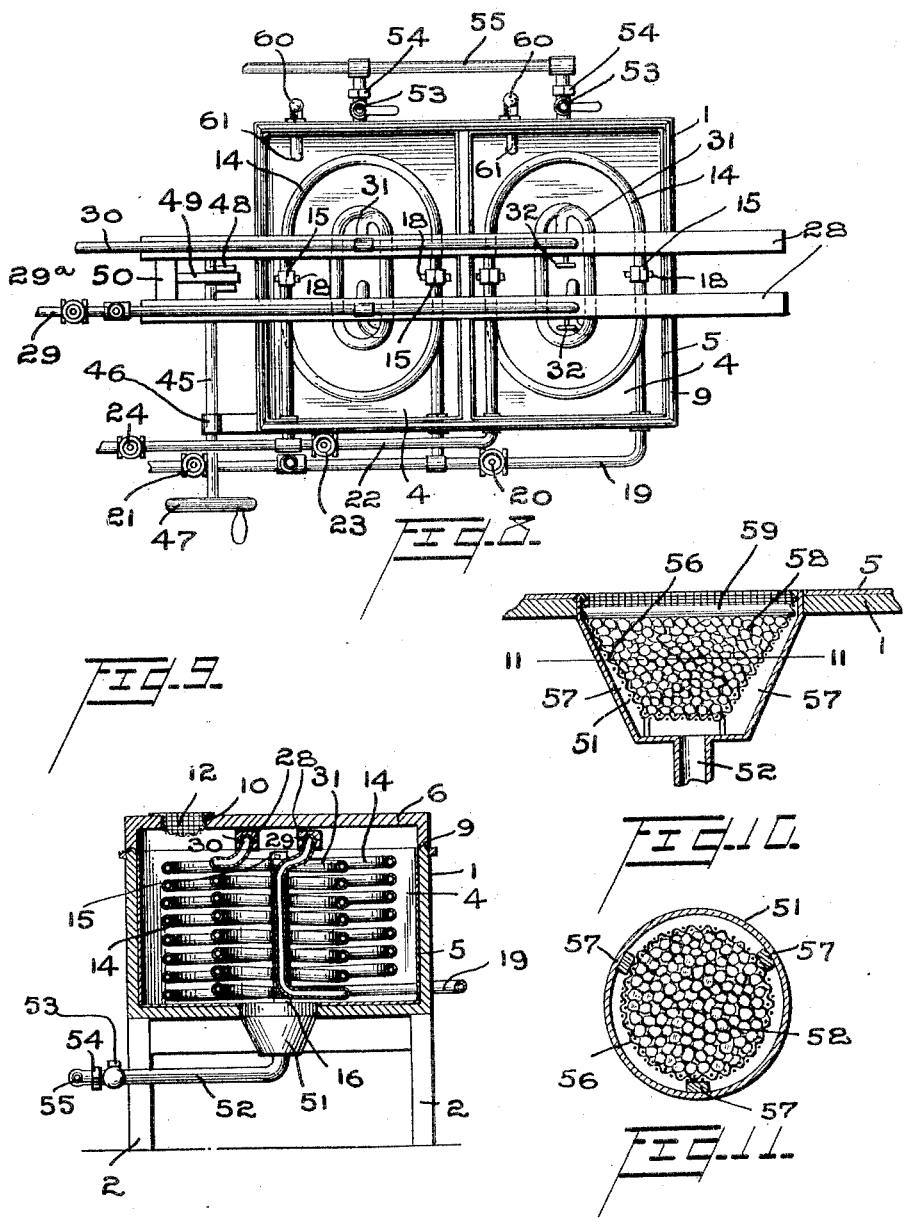

UNITED STATES PATENT OFFICE.

SAMUEL SHAPIRO, OF PHILADELPHIA, PENNSYLVANIA.

APPARATUS FOR PASTEURIZING AND COOLING MILK.

1,108,404.  Specification of Letters Patent.  Patented Aug. 25, 1914.

Application filed August 29, 1913.  Serial No. 787,281.

*To all whom it may concern:*

Be it known that I, SAMUEL SHAPIRO, a citizen of the United States, residing at Philadelphia, in the county of Philadelphia and State of Pennsylvania, have invented certain new and useful Improvements in Apparatus for Pasteurizing and Cooling Milk, of which the following is a specification.

My invention relates to improvements in apparatus for pasteurizing and cooling milk, an object of the invention being to provide an improved apparatus of this character in which the milk may be heated and then cooled in the same receptacle, and during the operation agitated sufficiently to prevent the separation of the cream from the milk.

A further object is to provide improved means for heating and cooling the milk while in the receptacle.

A further object is to provide improved means for agitating the milk, improved means for filtering the milk as it passes from the receptacle, and provide improved thermometers which indicate the temperature of the contents of the receptacle.

A further object is to provide an apparatus of the character stated with a plurality of chambers or compartments in which the operation of heating or pasteurizing and cooling may be carried on simultaneously or independently, and which apparatus reduces the handling of the milk to a minimum and insures a thoroughly pasteurized product to conform to the rules and regulations of any municipality.

A further object is to provide an apparatus of this kind which may be kept absolutely clean and sterile so as to prevent the accumulation of germs and to destroy any germ life that may be left in the receptacles after the milk has been withdrawn.

With these and other objects in view, the invention consists in certain novel features of construction and combinations and arrangements of parts as will be more fully hereinafter described and pointed out in the claims.

Figure 4:
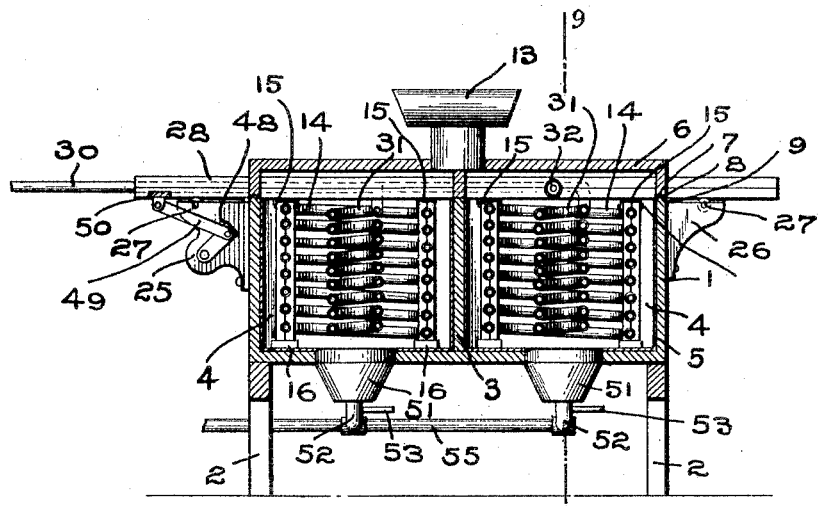
Figure 6:
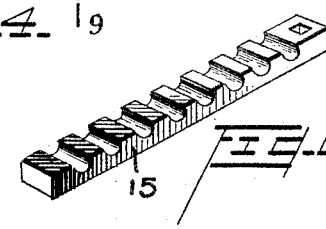
Figure 5:
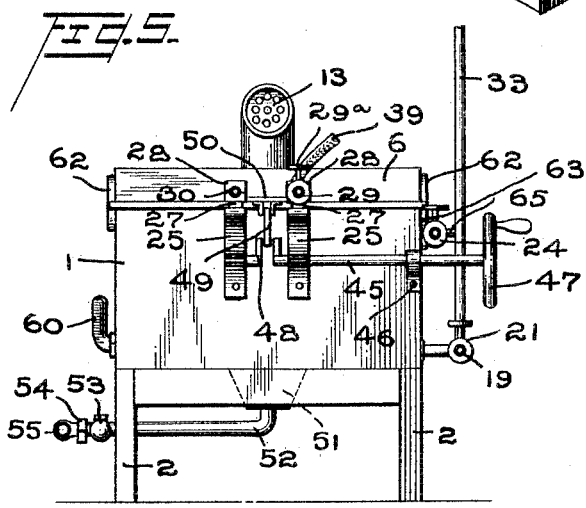
Figure 7:
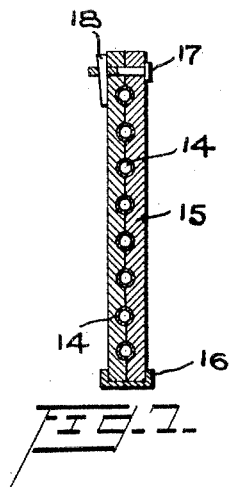

In the accompanying drawings: Figure 1 is a view in side elevation illustrating my improvements. Fig. 2 is a top plan view. Fig. 3 is an enlarged view partly in vertical section and partly in elevation illustrating one of my improved thermometers. Fig. 4 is a view in longitudinal section through the center of the apparatus. Fig. 5 is an end elevation. Fig. 6 is a perspective view of one of the notched coil clamping bars 15. Fig. 7 is a view in vertical section showing the clamping bars in operative position. Fig. 8 is a plan view of the apparatus with the cover removed. Fig. 9 is a view in transverse section on the line 9—9 of Fig. 4. Fig. 10 is a view in vertical section on an enlarged scale illustrating one of my improved filters, and Fig. 11 is a view in section on the line 11—11 of Fig. 10.

My improved apparatus comprises a tank 1, preferably supported on suitable legs 2 and divided by a vertical partition 3 into two receptacles 4, 4. While I have shown two receptacles, it is of course to be understood that the tank may be divided into any number of receptacles, and all of the receptacles are preferably lined with metal as indicated at 5.

A cover 6 fits on top of the tank and is provided throughout with a depending flange 7 having a groove 8 in its lower edge which fits over a raised bead 9 on the upper edge of the tank. This groove and bead form a tight juncture between the cover and the tank, preventing any dirt from passing into the tank and also preventing any dirt from collecting on the edge of the tank when the cover is removed.

Inlets 10 are provided in the cover over both receptacles, and these inlets are normally closed by pivoted covers 11. When pouring the milk into the receptacles, I locate strainers 12 in the openings 10 so that the milk will be thoroughly strained before it enters the receptacle.

A ventilator 13 is provided in the cover 6 at the center thereof and communicates with both receptacles as clearly shown in Fig. 4, so that during the operation of pasteurizing, the animal gases and vapors accumulating may readily escape.

In the receptacles 4, I locate stationary relatively large pipe coils 14 which are preferably, though not essentially, of elliptical form in plan and are firmly held by clamping bars 15. These clamping bars are illustrated in detail in Figs. 6 and 7. They are preferably of wood and are notched so as to receive the convolutions between them. The lower ends of the bars are positioned in metal cups 16 secured in the bottom of the receptacles and the upper ends of the bars are connected by bolts 17 having wedges 18 therethrough, said bolts and wedges being preferably of wood. By means of this structure the bars may be readily secured in position and removed whenever desired to thoroughly clean the pipes by the ordinary scrubbing operation.

The lower convolution of each coil constitutes the inlet of the coil, and the lower ends of both coils are connected to an inlet pipe 19 having a valve 20 located in said inlet pipe between the two coils and also having an inlet valve 21 controlling the flow of fluid to both coils.

The upper convolutions of the coils constitute the outlets thereof, and both of these upper coils are connected to an outlet pipe 22, the latter having a valve 23 located between the coils and also having a valve 24 which controls the flow through the outlet pipe.

By reason of the arrangement of valves above set forth, one coil may be operated without the other if desired, or both may be operated simultaneously.

To opposite ends of the tank 1, brackets 25 and 26 are secured. These brackets are arranged in pairs and support at their upper edges rollers 27 on which parallel horizontal bars 28 are mounted to move longitudinally. The bars 28 are also arranged in parallelism as shown clearly in Fig. 8, and each bar comprises two longitudinally grooved sections so as to accommodate between them, pipes 29 and 30 respectively.

The pipe 29 constitutes an inlet pipe and pipe 30 an outlet pipe. Located in both receptacles 4 and inside of the coils 14, I provide relatively small movable coils 31. The lower ends of these coils are connected to the inlet pipe 29, and the upper ends of the coils are connected to the outlet pipe 30. The coils 31, as a matter of fact, form continuations of these inlet and outlet pipes and are supported by the inlet and outlet pipes, and the latter supported by the bars 28, so that as the bars 28 are moved longitudinally, they will move the small coils 31 with them.

Valves 32 are provided in the small coil 31 in one of the receptacles 4, so that this coil may be cut out of operation if desired.

33 represents a supply pipe which connects with pipe 19 at a point between the valve 21 and the inlet to the nearest coil 14. This supply pipe is connected by a T-coupling 34 with a hot fluid supply pipe 35 and with a cold fluid supply pipe 36 having valves 37 and 38 respectively therein, so that by opening and closing these valves, the fluid of any desired temperature may pass to the apparatus.

The inlet pipe 29 of the smaller coils is connected by a flexible supply pipe 39 with a T-coupling 40, the latter communicating with a hot fluid supply pipe 41 and a cold fluid supply pipe 42, said supply pipes having valves 43 and 44 therein, so that by regulating these valves 43 and 44 the temperature of the fluid supplied to the smaller coils can be controlled.

In heating, I may use hot water, steam, or other hot fluid, and in cooling, cold water, brine, or other cooling fluid, but in any event it is to be understood that the fluid passing through both coils can be changed from hot to cold and vice versa entirely within the control of the operator.

To prevent the separation of the cream and milk during the heating and cooling operation, it is necessary to move the coils 31 backwardly and forwardly in the milk, and to do this, I provide a crank shaft 45 which is supported in the brackets 25 and in a third bracket 46, and is provided at its outer end with any approved means 47 for turning the same.

A crank arm 48 on the shaft 45 is pivotally connected by a link 49 with a block 50, the latter secured to both bars 28. When the crank shaft 45 is revolved, it will, through the medium of the link 49, impart a reciprocating movement to the bars 28, and cause the small coils 31 to move through the milk and sufficiently agitate the milk to prevent separation.

In the bottom of the receptacles 4, I provide truncated conical outlet chambers 51 with which outlet pipes 52 communicate. These pipes 52 extend to one side of the apparatus, and are provided with valves 53. The pipes 52 are connected by couplings 54 with an outlet pipe 55, so that milk from both receptacles may be discharged through the pipe 55 into a bottling machine, and I would have it understood that I preferably so locate the apparatus that the milk will feed by gravity to the bottling machine, so that I may eliminate the necessity for a pump.

Each outlet chamber 51 is provided with a truncated conical screen 56 spaced from the wall of the outlet chamber by a plurality of wedge shaped strips 57, and said screen preferably contains gravel 58, and is provided with a handle 59 to permit the removal of the screen and the cleaning thereof whenever desired.

The screen and the gravel form a filter, so that the milk as it flows out of the receptacle is thoroughly filtered before passing to the bottling machine.

Each receptacle 4 is provided with a thermometer 60 as shown in detail in Fig. 3. The lower end of the thermometer constitutes a metal tubular extension 61 which projects into the receptacle a distance to insure a proper recording of the temperature of the contents of the receptacle and not be affected materially by the outside temperature.

The cover 6 is preferably supported on pivoted links 62, one of which has a gear 63 at its pivot point driven by a pinion 64 operated by a crank 65 so that the cover may be readily elevated whenever desired.

In operation, the milk is poured into both receptacles, and the valves operated to permit steam, hot water, or other heating agent to flow through the coils until the temperature of the milk reaches the necessary degree for pasteurizing, when the valves are operated to maintain this temperature and such temperature is maintained for the desired length of time in accordance with the municipal regulations. While the milk is being heated, the coils 31 are moved backwardly and forwardly through the milk as above explained, and when the pasteurizing operation is completed, the valves are operated to admit the cooling liquid to the coils, so that the temperature of the milk may be lowered to the desired degree, when the milk is drawn off through the filters and bottled.

When the operation of pasteurizing and cooling is ended, the interior of the receptacle and the coils may be thoroughly cleaned in the ordinary manner by brushing and scrubbing and after this operation is over, the cover 6 is placed on the apparatus and the hot steam or water admitted to the coils to bring the temperature of the air within the receptacles to a degree sufficient to destroy any germ life within the apparatus. This heat not only thoroughly dries the apparatus, but thoroughly exterminates any germ life so that the apparatus is maintained in a perfectly sanitary condition.

It will also be noted that when the milk is poured into the receptacle, it is both pasteurized and cooled in the same receptacle, so that the handling of the milk is reduced to a minimum.

The valves 21 and 29ª in pipes 19 and 29 respectively are normally closed, but may be opened when some other fluid such as brine is forced through the pipes from some source (not shown).

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. An apparatus of the character described, comprising a receptacle, heating and cooling coils in the receptacle, one coil located inside the other, and means for moving one of said coils, substantially as described.

2. An apparatus of the character described, comprising a receptacle, two heating and cooling coils in the receptacle, one coil located inside the other, parallel bars supporting one of said coils and movable on top of the receptacle, means on one end of the receptacle for reciprocating said bars, the inlet and outlet pipes of said last-mentioned coil located parallel to each other and supported on said bars, substantially as described.

3. In an apparatus of the character described, the combination with a receptacle, a stationary coil within the receptacle, a movable coil within the receptacle, means for directing fluid into said coils, reciprocating bars supporting said movable coil, and means for reciprocating the bars, substantially as described.

4. In an apparatus of the character described, the combination with a tank divided into a plurality of receptacles, of relatively large stationary coils in the said receptacles, reciprocating bars mounted in the upper portions of the receptacles, relatively small coils supported by said bars and located within the relatively large coils, and means for supplying heating and cooling agents to said coils, substantially as described.

5. In an apparatus of the character described, the combination with a tank divided into a plurality of receptacles, of relatively large stationary coils in the said receptacles, reciprocating bars mounted in the upper portions of the receptacles, relatively small coils supported by said bars and located within the relatively large coils, means for supplying heating and cooling agents to said coils, brackets on the ends of the apparatus, rollers on said brackets supporting the bars, and means at one end of the receptacles for reciprocating the bars, substantially as described.

6. In an apparatus of the character described, the combination with a receptacle, of a stationary coil in the receptacle, bars mounted to reciprocate in the upper portion of the receptacle and constituting two grooved sections secured together, an inlet pipe housed within one bar and an outlet pipe housed within the other bar, and a relatively small coil connected at its ends with said inlet and outlet pipes and movable in the receptacle within the fixed coil, substantially as described.

7. In an apparatus of the character described, the combination with a tank divided into a plurality of receptacles, of bars mounted to slide in the upper portions of the receptacles, inlet and outlet pipes carried by said bars, each bar comprising two longitudinally grooved sections inclosing the said pipes, coils suspended from the bars and communicating at their ends with said inlet and outlet pipes, and stationary coils located within the tank and inside of which said first-mentioned coils are movable, substantially as described.

8. In an apparatus of the character described, the combination with a tank divided into a plurality of receptacles, of bars mounted to slide in the upper portions of the receptacles, means on one end of the tank for reciprocating said bars, inlet and outlet pipes carried by said bars, each bar comprising two longitudinally grooved sections inclosing the said pipes, coils suspended from the bars and communicating at their ends with said inlet and outlet pipes, means on the outside of the tank for reciprocating the bars, and stationary coils located within the tank and inside of which said first-mentioned coils are movable, substantially as described.

9. In an apparatus of the character described, the combination with a receptacle, of stationary heating and cooling means in the receptacle, reciprocating means above the receptacle, and a heating and cooling device carried by the reciprocating means, substantially as described.

In testimony whereof I have signed my name to this specification in the presence of two subscribing witnesses.

SAMUEL SHAPIRO.

Witnesses:
M. E. DITTUS,
CHAS. E. POTTS.

---

Copies of this patent may be obtained for five cents each, by addressing the "Commissioner of Patents, Washington, D. C."